March 29, 1949.    E. RAMSAY    2,465,479
MINE CAR WHEEL BEARING STRUCTURE
Filed June 24, 1944    2 Sheets-Sheet 1
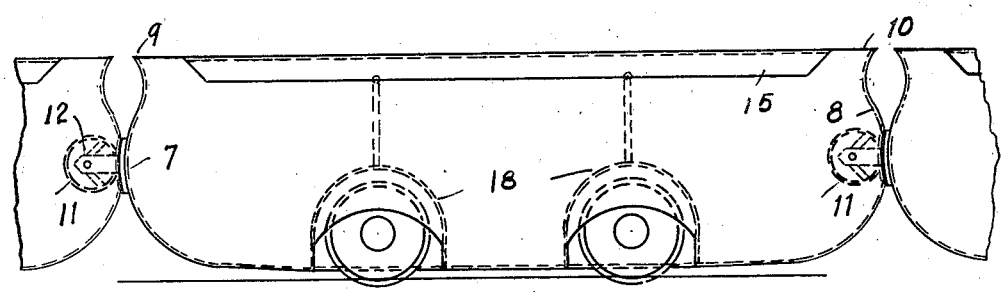
Fig 1
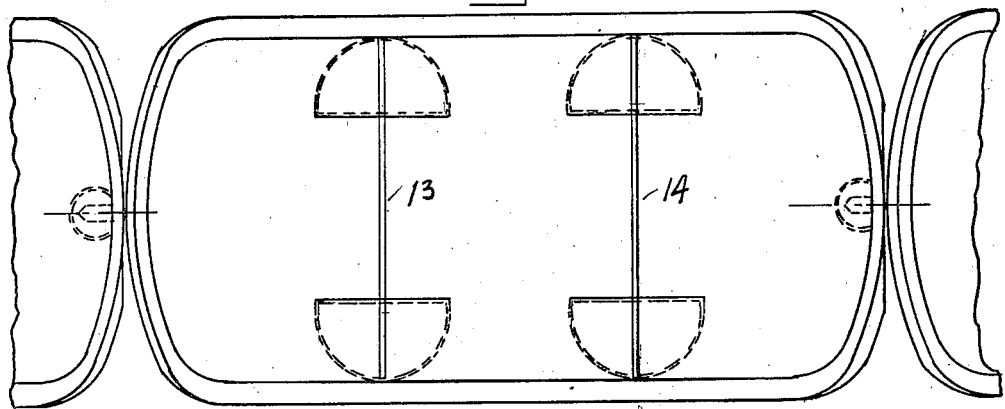
Fig 2
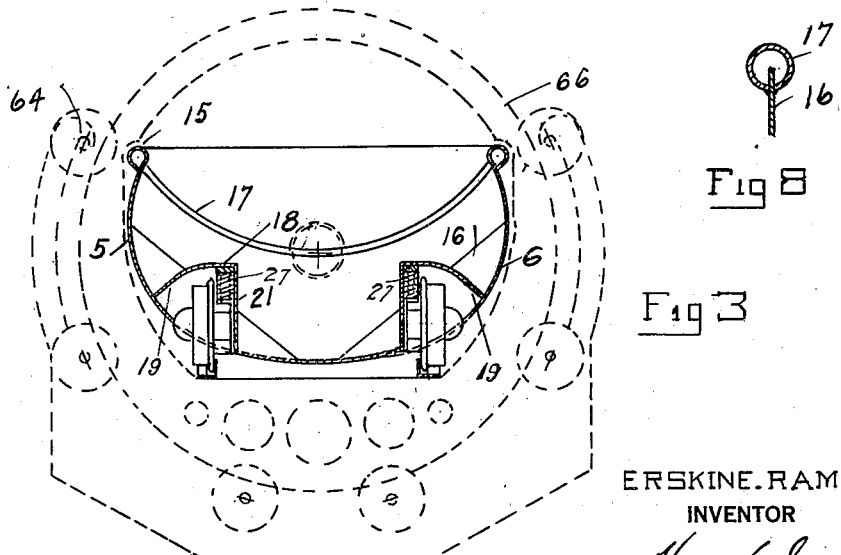
Fig 3
Fig 8
ERSKINE. RAMSAY
INVENTOR
BY *Henry L. Jennings*
ATTORNEY

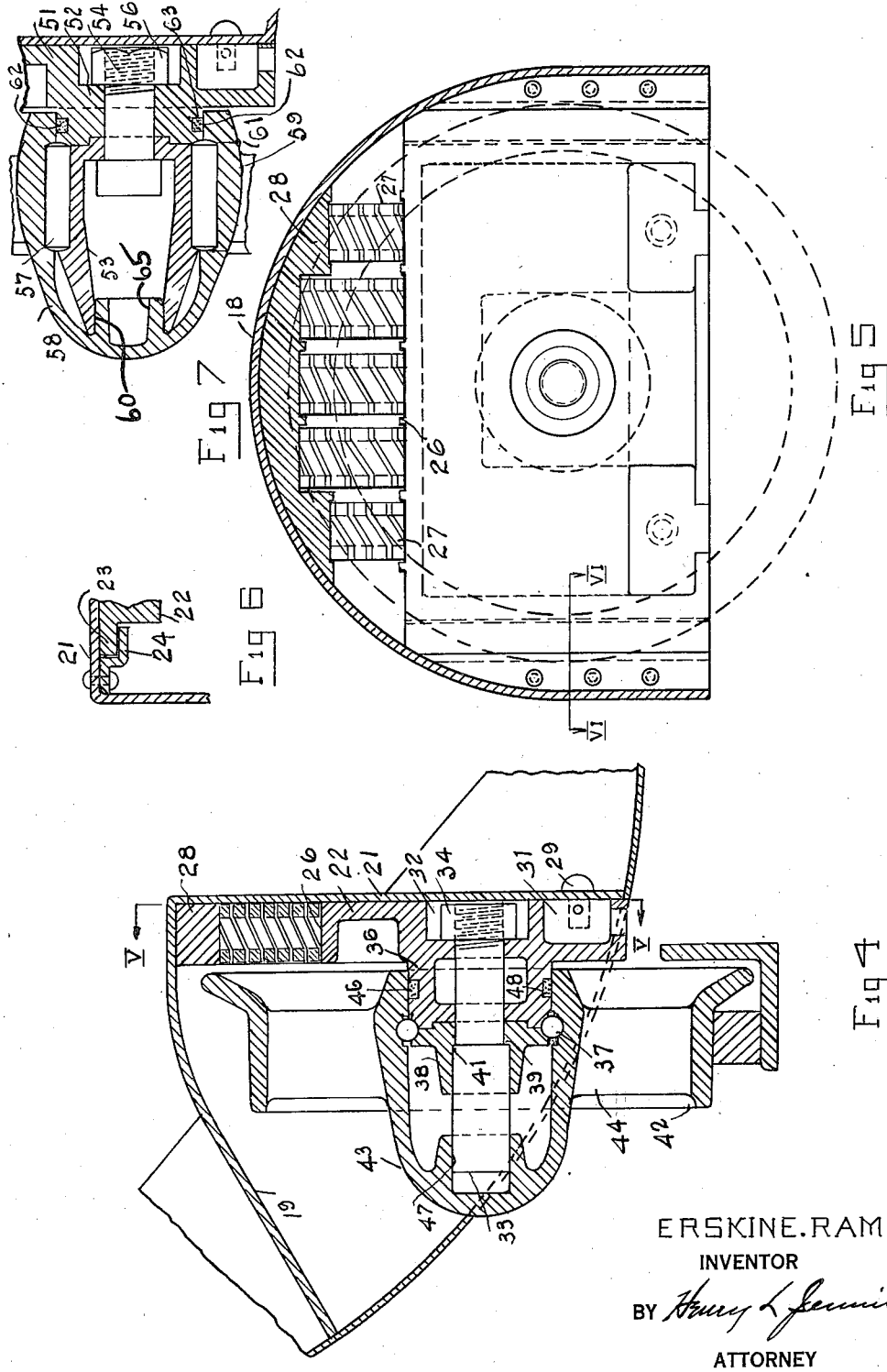

Patented Mar. 29, 1949

2,465,479

UNITED STATES PATENT OFFICE 2,465,479

MINE CAR WHEEL BEARING STRUCTURE

Erskine Ramsay, Birmingham, Ala.

Application June 24, 1944, Serial No. 542,018

2 Claims. (Cl. 295—42)

This invention relates to mine cars, and includes among its principal features a car body having outwardly curving sides with wheel housings inset into the sides of the car body, and wheels mounted therein on bearings supported by stub axles, whereby the bottom of the car body is directly above the level of the rails; also a car body having spheroidal ends with coupling members telescoping into the ends of the cars, whereby to reduce the space between cars.

A further object of my invention is to provide a mine car formed from steel plate pressed to shape to form outwardly curved sides and ends which shall include improved bracing and stiffening means whereby the maximum capacity and strength is obtained with minimum weight.

These and other advantages of my improved construction will be apparent from a consideration of the accompanying drawings, forming a part of this application, in which Fig. 1 is a side elevation of a mine car constructed in accordance with my invention and showing it coupled to the two other cars at the ends;

Fig. 2 is a plan view of the car shown in Fig. 1;

Fig. 3 is a transverse sectional view of the car through the wheel housings and also showing the adaptability thereof for operation with a car dump;

Fig. 4 is a sectional view through a wheel and housing therefor, drawn to a larger scale;

Fig. 5 is a sectional view taken along the line V—V of Fig. 4;

Fig. 6 is a detailed sectional view taken along the line VI—VI of Fig. 5;

Fig. 7 is a detail sectional view showing the construction for roller bearings for the wheels; and Fig. 8 is a detail sectional view showing the manner of attaching a reinforcing tube to one of the gussets.

Referring to the drawings, my improved car body is made from steel plates pressed to shape, and preferably welded together, having outwardly curved sides 5 and 6, and with spheroidal ends 7 and 8. Preferably the upper edges are provided with a reverse curve outwardly at the top, as shown at 9 and 10, in order to minimize the space between cars. The sides of the car have their edges rolled over as shown at 15 to provide reinforcement. At one end of each car, I provide a spheroidal socket 11 which forms the female member of a coupling and at the other end I provide a male member 12 which is adapted to enter the socket of the car to which it is coupled, and coact therewith to couple the cars together. The details of this coupler form the subject matter of a co-pending application, Ser. No. 578,683, filed February 19, 1945, now Patent No. 2,407,449, issued Sept. 10, 1946.

The car bodies are braced by transverse gussets 13 and 14, each composed of a plate 16 with the top curved downwardly between the sides of the car as shown in Fig. 3, and having a tubular reinforcement 17 welded thereto along the top edge. The reinforcement 17 may conveniently be made as shown in Fig. 8, from a pipe slit along its length to form a notch in which the edge of the plate 16 enters and is welded thereto along each line of contact.

The wheel housings 18, four in number, are each shaped to form a circular hood 19 overhanging each wheel and a vertical inner wall 21 from which the wheel mounting is supported. The sides of the car body are cut out as shown in Figs. 3 and 4, to receive the wheel housings, and the housings are welded to the sides of the car body along the lines of juncture. It will be seen from Figs. 1 and 2, that the transverse gussets 13 and 14 are positioned centrally over the wheel housings 18 at front and rear of the car. There is thus provided a maximum of support for the housings.

Each of the wheel mountings comprises an axle supporting casting 22, having side flanges 23, which fit in guides 24, secured to the vertical plate 21 of the wheel housing as shown in Fig. 6. The upper surface of the axle supporting casting 22 extends horizontally across as shown at 26 to form a spring seat in which springs 27 are seated and which bear at their upper ends against a block 28 located in the upper part of the wheel housing 18, and having corresponding spring seats formed therein. The axle supporting casting 22 is free to move up and down in its guides 24 and is limited in its movement only by a pin 29 which extends through the vertical wall 21 into a pocket 31 formed in the casting 22.

The axle supporting housing 22 is also provided with a pocket 32 into which extends the threaded end of a stub axle 33 which is secured in place by a nut 34 in the pocket 32. A collar 36 is formed on the axle supporting housing 22 and surrounds the stub axle 33 to form half the inner race for a ball bearing 37. The other half of the bearing race is formed in a sleeve 38 which is bored out to fit about the axle 33 and is provided with a shoulder 39 which cooperates with a corresponding shoulder 41 on the axle so that when the nut 34 is tightened, the outer half of the race 38 is drawn tightly in place. The wheel 42 has a hollow hub 43 and forms the outer member thereof. The outer end of the hub 43 is bored out at 47 to form a sleeve bearing for the outer end of the stub axle 33. Packing 46 fits in a groove 48 of the collar 36 and bears against the inner surface of the hub 43 to prevent the escape of oil from the bearings or the entrance of grit and sand.

In Fig. 7 I show a modified form of bearing which may be used with my improved car. In accordance with this modification, the axle supporting casting 51 is provided with a relatively short stationary hub portion 52. Fitting on the outer end of the sleeve 52 is an extension 53 which is held in place by the stub axle 54 and nut 56. The extension 53 forms the inner race for a roller bearing 57. The outer race of the roller bearing 57 is formed by the hollow hub 58 of the wheel 59. The bearing is assembled by cutting out a section, such as 61, through which a single roller may be inserted, and after all the rollers have been inserted the cut out portion 61 is welded back in place. The bearing shown in Fig. 7 is sealed against the escape of oil or the entrance of grit by means of packing 62 seated in a groove 63 in the stationary hub member 52. As shown in Fig. 7, the outer end of the extension 53 is bored out at 60 to form a sleeve bearing surrounding an inward projection 65 of the hub 58.

It is contemplated, in accordance with my invention, that the bearings shown either in Fig. 4 or Fig. 7 will be lubricated when the car is constructed and the wheels installed, and that it will require no further lubrication for the life of the wheel.

In Fig. 3 of the drawing I show my improved car as being located within the rings of a rotary car dump, such for example as shown in my prior Patents Nos. 1,685,203 or 2,179,100, or any other well known form of rotary car dump. It will be seen that the longitudinal rolled edges 15 of the car body adapt themselves to be engaged by the clamp members 64 which are rotatably mounted in the rings 66. It will be further seen that the construction of my improved mine car lends itself admirably to operation in a rotary dump whereby all of the coal within the car may be discharged as the car is inverted.

From the foregoing it will be apparent that I have devised a mine car of maximum strength and capacity, with the lowest possible center of gravity, and a minimum distance between coupled cars. It will also be seen that I have provided a wheel mounting which occupies a minimum of space in the body of the car, and which provides a yielding support for the car thereby reducing shock and insuring long life to the car and to the wheel.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. A wheel bearing structure comprising a mounting bracket, an axle supported by the bracket, a collar extending outwardly from the bracket and forming the inner race of a friction reducing bearing, the friction reducing bearing being disposed adjacent the mounting bracket, a wheel mounted on the axle and having a hub forming the outer race of the bearing, and a sleeve bearing formed in the hub for receiving the outer end of the axle.

2. A wheel bearing structure comprising a mounting bracket, an axle supported by the bracket, a divided collar extending outwardly from the bracket and forming the inner race of a friction reducing bearing, said friction reducing bearing being disposed adjacent the mounting bracket, a wheel mounted on the axle and having a hub forming the outer race of the bearing, and a closure for the outer end of the hub machined internally to form, with the axle, a sleeve bearing for the outer end of the axle.

ERSKINE RAMSAY.

REFERENCES CITED

The following references are of record in the file of this patent:

UNITED STATES PATENTS

| Number | Name | Date |
|---|---|---|
| 882,534 | Phillips | Mar. 17, 1908 |
| 1,508,123 | Ramsay | Sept. 9, 1924 |
| 1,729,113 | Linhardt | Sept. 24, 1929 |
| 1,782,622 | Kilian | Nov. 25, 1930 |
| 2,056,652 | Edmunds et al. | Oct. 6, 1936 |
| 2,076,239 | Lemmon | Apr. 6, 1937 |
| 2,112,859 | Moore | Apr. 5, 1938 |
| 2,142,412 | Ramsay | Jan. 3, 1939 |
| 2,161,210 | Waalkes | June 6, 1939 |

FOREIGN PATENTS

| Number | Country | Date |
|---|---|---|
| 693,474 | Germany | July 10, 1940 |